March 5, 1929.  J. BECKER  1,704,239
FUEL GAS DISTRIBUTING SYSTEM FOR COKE OVENS
Filed May 29, 1925   2 Sheets-Sheet 1
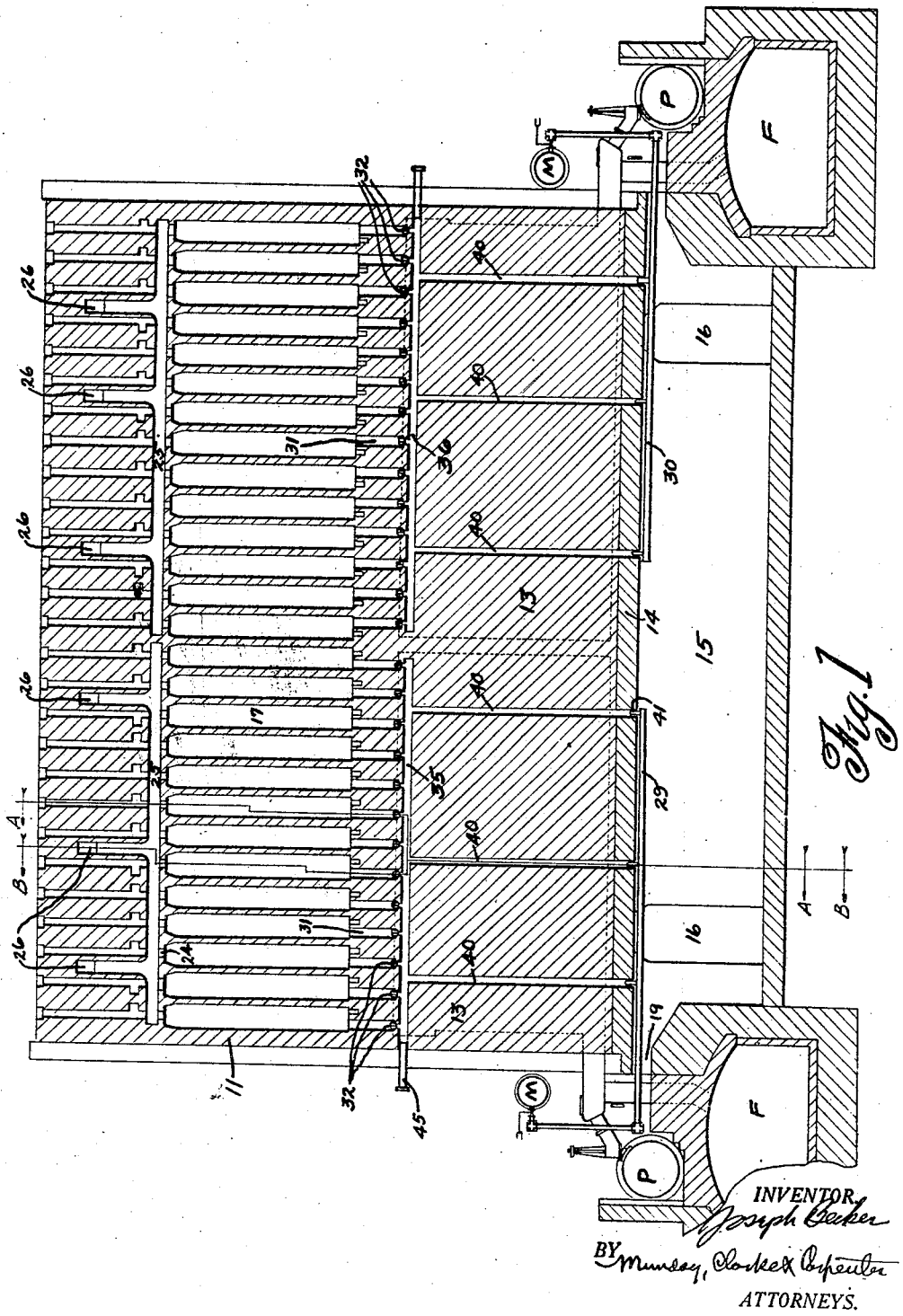
INVENTOR
Joseph Becker
BY Munday, Clarke & Carpenter
ATTORNEYS.

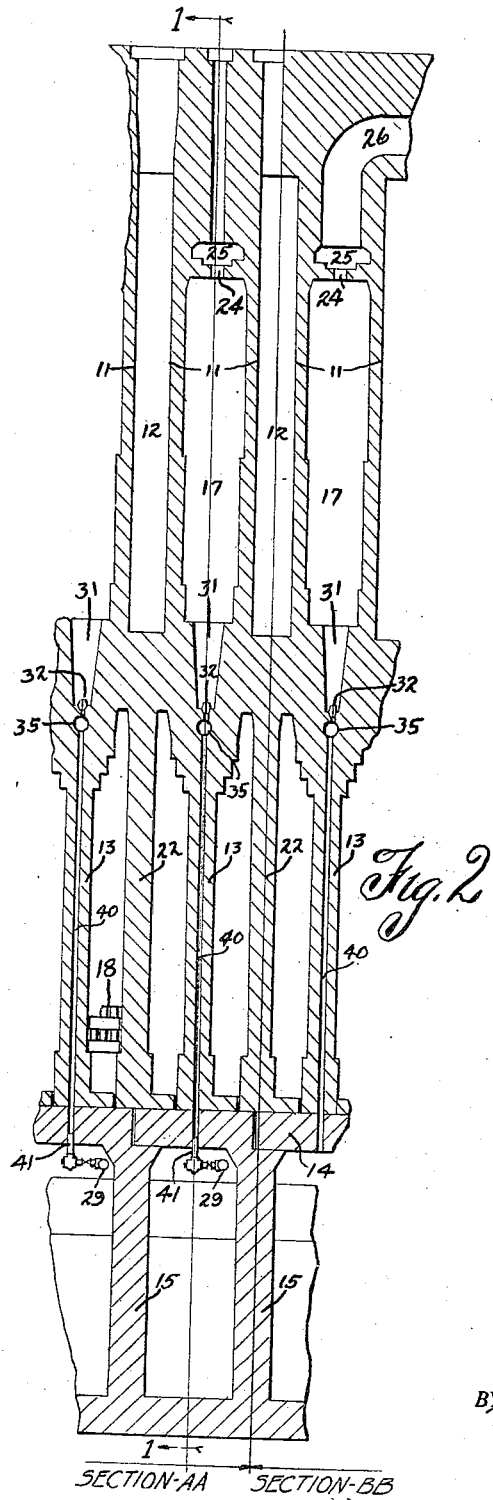

Patented Mar. 5, 1929.

1,704,239

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

FUEL-GAS-DISTRIBUTING SYSTEM FOR COKE OVENS.

Application filed May 29, 1925. Serial No. 33,811.

My invention comprehends improvements of general utility in heat treating apparatus in which a combustible gas is supplied to a heating wall, and in its more specific aspects, relates to the distribution of fuel gas to the flued walls of coke ovens, being equally applicable to ovens using fuel gas alone and to ovens of the so-called combination type, the ovens of the so-called Koppers and Becker types being specific instances.

It has heretofore been a common practice to introduce the fuel gas through horizontal supply ducts located in the top of the regenerator division walls, said supply ducts being directly connected to the flues of the heating walls by vertical connecting ducts. Since the gas passes from the main through the horizontal ducts at an appreciable velocity it becomes necessary to compensate for the velocity effect to obtain uniform distribution of the gas to the several flues. Moreover, as thus located, the horizontal supply duct lies in a region of intense heat so that the gas introduced therein from the main exteriorly of the brickwork becomes more highly heated as it passes along the duct and its density accordingly decreases from the point of intake to the end of the duct. These factors necessitate the graduation of the nozzles located in the vertical ducts to effect the supply of a substantially uniform quantity of gas to each successive flue. If, as has been proposed, the supply ducts are located below the pillar walls of the regenerator chambers and are directly connected by vertical ducts passing therethrough with individual combustion flues respectively, pressure regulating metallic orifices being provided at their lower ends, one or more of these nozzles frequently become clogged with dirt and gummy condensates which are accumulative in their action, resulting in certain of the vertical flues being robbed of their quota of gas while others receive a much increased quota, causing irregularities in heat distribution and possibly even fluxing of flues.

All of these difficulties I overcome by locating the fuel gas supply ducts exteriorly of the oven beneath and lengthwise of the pillar walls connecting them through a plurality of preferably vertical ducts to gas pressure equalizing channels substantially parallel therewith and located preferably in the tops of said walls, said equalizing channels in turn being connected to a plurality of preferably vertical ducts, provided at their junction points with refractory nozzles, with the respective flues of the heating walls. The vertical connecting ducts between the gas supply ducts and the equalizing channels may, if desired, be equal in number to the number of flues of the respective heating walls and are preferably connected to the equalizing channels in staggered relation to the ducts connecting the latter with the heating flues. I may also, if desired, provide regulating orifices preferably at the bottoms of the vertical connecting flues between the supply ducts and the equalizing channels. By these simple expedients I greatly reduce the velocity of the gas passing into the distributing or equalizing channel from the several connecting ducts leading from the supply duct, the decrease of the velocity therein being proportional to the number and area of the connecting ducts employed and the equalization being further facilitated by the staggered relation of the respective sets of ducts connected therewith. By this construction, should any irregularity in flow occur in any of the vertical connecting ducts, it would not materially affect the uniformity of pressure at the nozzles supplying the respective flues since the vertical ducts not so affected would compensate for the variation by supplying an increased quantity of gas to the equalizing channel. I thus substantially eliminate the danger of fluxing the heating flues by irregular fuel gas distribution. Since the pillar walls are cool at their base, becoming hot at their tops, the temperature of the gas in the supply duct is substantially uniform throughout and the temperature in the connecting ducts between the same and the equalizing channel varies substantially uniformly in each from bottom to top and therefore gas of substantially uniform temperature is supplied by each to the equalizing channel. Hence variation of temperature and pressure existing in prior gas distributing systems are eliminated in my system, both the temperature and the pressure of the gas supplied to the several flues being substantially uniform, thus obviating the necessity for special regulation by means of graduated nozzles.

While the system thus far described is of general utility, it is of special advantage when employed in an oven whose opposite walls are provided with flues connected at their tops by horizontal channels, the horizontal channels of the opposite walls being inter-connected in turn by a plurality of connecting ducts, for in the latter case, the uniformity of the temperature and pressure of the gases issuing from the flues of one wall is maintained and the gases are passed across to the flues of the opposite wall and through the same, the uniformity of temperature and pressure of the gases at corresponding points in their paths being preserved throughout.

As a further important feature of my invention I extend the equalizing channels at one end through to the outside of the brickwork in order that they may be accessible for cleaning and also in order that atmospheric air may be passed therethrough to burn out carbon and tarry or other deposits from the gas frequently occurring in regions of high temperature. This air being introduced at low pressure has no tendency to be forced back into the fuel gas supply through leaky cocks or by reason of other mechanical failures or faulty operation, thereby giving rise to dangerous mixtures, as is possible when the air is forced in from the bottom under pressure through the supply duct and small metallic orifices designed for pressure operation. I may locate the equalizing channel in a region so selected that ordinarily there will be no tendency for carbon or tarry deposits to form below it thus obviating the necessity of cleaning the small metallic orifices below. I may, however, introduce the air from the bottom through said orifices in the usual manner if desired.

In accordance with the best accepted practice I have shown the air supplied to undivided regenerators through channels in their soles, which, upon reversal, are employed to convey the waste gases therefrom, although the air might be introduced through individual ducts and sectional regenerators. The most satisfactory results, however, are obtained by the introduction of the air in the former manner, due to the fact that the convection currents produced within the undivided regenerator chambers between the gases at different temperatures therein cause rapid diffusion so that both the air and, on reversal, the waste gases within such regenerator chambers quickly acquire a uniform temperature and pressure throughout, resulting in perfect equalization. The complications of structure and cost of installation of the less efficient individual ducts or channels and sectional regenerators without attendant advantages, therefore, render such construction, from an engineering point of view, unwarranted.

In addition to the general features and objects of the invention above recited, the invention has such other improvements or advantages in construction and operation as are found to obtain in the structure and device hereinafter described or claimed.

In the accompanying drawings, forming a part of this specification, and showing for purposes of exemplification, a preferred form and manner in which the invention may be embodied and practiced, but without limiting the claimed invention specifically to such illustrative instance or instances:

Figure 1 is a vertical cross-section transversely of the battery through a heating wall taken on the line 1—1 of Fig. 2, and Fig. 2 is a fragmentary vertical sectional view taken longitudinally of the battery, the section B—B being taken on the line B—B—Figure 1, and section A—A being taken on the line A—A of the same figure.

The same characters of reference indicate the same parts in each of the several views of the drawings.

Referring to the drawings there are illustrated a plurality of crosswise elongated heating walls 11 and a plurality of crosswise elongated vertical coking chambers 12 supported by heavy supporting or pillar walls 13 which extend crosswise of the battery and are located as shown in Fig. 2 beneath the respective heating walls 11. These pillar walls, together with other walls, collectively form the main support for the entire superstructure of the oven battery and are themselves supported upon a flat pad or platform 14, which in turn rests upon supporting walls 15 provided with doors 16 by means of which access to the tunnels formed by these walls below the oven may be had. These tunnels are further provided with ventilation spaces 19. The heating walls 11 are each provided with a plurality of combustion flues 17 connected in the usual manner to the regenerators 18 which are located between the pillar walls 13 and intermediate supporting walls 22. Each flame flue 17 of each heating wall has at its top a port or opening 24 leading to a bus flue 25 formed in the heating wall, there being shown in the present instance two of such horizontal flues positioned end to end with respect to each other and respectively located on opposite sides of the battery. Each of these bus flues is connected with the corresponding bus flue in the wall on the opposite side of the oven chamber by means of a plurality of passageways 26. I have shown three such passageways connected to each horizontal flue 25, although it is obvious that any number from one up to the number of heating flues feeding into the horizontal flue may be employed.

Extending crosswise of the battery through the ventilation spaces 19 and along the tops of the tunnels and beneath the respective pillar walls 13 extend gas supply channels or ducts 29 and 30 on opposite sides of the battery respectively. These channels or ducts supply coke oven gas to the several flame flues when the oven is operated on such gas. Ducts 31 provided at their lower ends with the usual refractory nozzles 32 lead into the bottoms of each combustion flue 17 for supplying the fuel gas thereto. In accordance with prior practice these ducts were directly connected to the gas supply channels or ducts 29—30, but such connection is subject to all of the disadvantages hereinabove enumerated. In accordance with my present invention, I provide equalizers or equalizing channels 35—36 extending preferably through the tops of each pillar wall and on opposite sides of the center thereof to which the ducts 31 are directly connected at their lower ends. These equalizers or equalizing channels I connect with the gas supply channels or ducts 29—30 by a plurality of vertical ducts 40 preferably lying within the pillar walls, and preferably provided at their lower ends with regulating orifices 41 accessible from the tunnels, these ducts being connected to the equalizing channels in staggered relation to the connections of the ducts 31 therewith. I thus obviate the tendency to a direct and continuous flow of the gas from the duct 40 through a duct 31 and by causing the gas issuing from the ducts 40 to impinge against the upper wall of the equalizing channel effect its more even distribution therein. By employing a plurality of connecting ducts 40 I also materially reduce the velocity of the gas supplied the equalizing channel and effect its uniform distribution along the channel, thus equalizing the pressure therein. It will be also obvious that the connecting ducts 40 pass through regions having corresponding temperature characteristics, being cooler at the bottom and hotter at the top, so that the gases issuing from the respective connecting ducts will have substantially the same temperature. It thus follows that the gas in the equalizing channel is both of uniform temperature and of uniform pressure throughout. The number of connecting ducts 40 may be advantageously selected equal to the number of cross-over passageways 26, both being staggered with reference to the combustion flues 17, although it is obvious that any other number of connecting ducts may be employed.

In operating the battery with fuel or coke oven gas the latter is fed from the main M to the gas supply channels or ducts 29—30 and from the latter through the orifices 41 selected to give the distribution desired, thence upwardly through the connecting ducts 40 to the equalizers or equalizing channels 35—36, then upwardly through the nozzles 32 and ducts 31 to the combustion flues 17 where it combines with air supplied to the combustion flues in the usual manner as described in my prior Patent No. 1,374,546, patented April 12, 1921. The products of combustion pass from the tops of the flues 17 through the ports 24 into the horizontal flues 25 and thence through the cross-over passageways 26 to the flues in the opposite side of the adjacent oven chamber and thence downwardly through the flues and out through the waste gas regenerator and to the waste heat flue F in the usual manner.

When the oven is operated on producer gas it is supplied from the producer gas main P in the usual manner.

The equalizer channels 35, 36 are open at their outer ends to permit cleaning or the introduction of air to burn out the carbon and tarry or other deposits, as hereinbefore set forth, their open ends being closed during normal operation by the decarbonizing guns 45. Decarbonizing air may, however, if desired, be introduced from the bottom through the supply ducts 29, 30 in the usual manner.

The invention as hereinabove set forth is embodied in a particular form of construction, but may be variously embodied within the scope of the claims hereinafter made.

I claim:

1. In a coking oven, or the like, in combination: a heat treating chamber; heating walls on opposite sides thereof provided with substantially vertical flues; substantially horizontal flues at their top communicating therewith, the horizontal flues on opposite sides of the chamber being interconnected by a plurality of ducts; regenerator chambers and pillar walls separating the latter located below said oven chamber and heating walls; fuel gas pressure equalizing and distributing channels, said channels communicating respectively with the flues of the respective heating walls; fuel gas supply ducts located below the regenerator chambers and pillar walls; and a plurality of substantially vertical ducts passing through said pillar walls and connecting the respective supply ducts with said distributing channels; substantially as specified.

2. The combination as defined in claim 1, in which the ducts connecting the horizontal flues at the top of the respective heating walls and the vertical ducts connecting the supply ducts with the distributing channels are both staggered with relation to the flues in the heating walls; substantially as specified.

3. The combination as defined in claim 1, in which the vertical ducts connecting the supply ducts with the distributing channels are staggered with relation to the flues in the heating walls; substantially as specified.

4. In a coking oven, or the like, in combination: a heating chamber; a heating wall adjacent thereto provided with combustion flues operable in parallel; a gas supply equalizer located within the brickwork and supplied from underneath the structure, said flues being connected thereto; and regenerators located alongside said equalizer; substantially as specified.

5. The combination as defined in claim 4, in which the equalizer is provided with removable nozzles; substantially as specified.

6. The combination as defined in claim 4, in which the equalizer at an end is accessible from the outside; substantially as specified.

7. In a coking oven, or the like, in combination: a heat treating chamber; heating walls on opposite sides thereof provided with combustion flues operable in parallel, the flues of the opposite heating walls being connected to each other at one end; a gas equalizer; means for connecting the other ends of one set of said flues to said gas equalizer; and a gas supply duct connected to said equalizer; substantially as specified.

8. The combination as defined in claim 7, in which regenerator chambers and pillar walls separating the same are located beneath the oven chamber and heating walls, the connecting paths between the gas supply duct and equalizer passing through said pillar walls; substantially as specified.

9. In a coking oven, or the like, in combination: a heating wall provided with combustion flues operable in parallel; a gas supply equalizer connected to said flues at one end of the latter; a gas supply duct; and means for connecting said gas supply duct to said gas supply equalizer through a plurality of paths having substantially the same temperature values; substantially as specified.

10. The combination as defined in claim 9, in which the combustion flues and the paths between the gas supply duct and the supply equalizer are connected to the latter in staggered relation to each other; substantially as specified.

11. The combination as defined in claim 9, in which a pillar wall and regenerator chamber are provided below the heating wall and in which the paths for connecting the gas supply duct to the supply equalizer comprises similarly located connecting ducts passing through said pillar wall; substantially as specified.

12. In a coking oven, or the like, in combination: a heating wall provided with combustion flues operable in parallel; a gas supply equalizer connected to said flues at one end of the latter; a gas supply duct; and means for connecting said gas supply duct to said gas supply equalizer through a plurality of paths; substantially as specified.

13. In a coking oven, or the like, in combination: a heating wall provided with combustion flues operable in parallel; a gas supply equalizer connected to said flues at one end of the latter; a gas main; a gas supply duct connected thereto; and means for connecting said gas supply duct to said gas supply equalizer; substantially as specified.

14. The process of operating coke ovens, or the like, comprising heat treating chambers provided on opposite sides thereof with flued heating walls, which process consists in substantially equalizing the pressure and temperature of the combustion gases at the intakes of the several flues in one wall; causing the combustion of the gases in said flues; substantially maintaining the equalization of pressure and temperature of the waste gases issuing from the other ends of said flues; and passing said waste gases into the corresponding ends of the flues in the opposite wall, and through and out of the other ends thereof; substantially as specified.

15. In a coking oven, or the like, in combination: a heating chamber; a heating wall adjacent thereto provided with combustion flues operable in parallel; a gas supply equalizer located within the brickwork and supplied from underneath the structure, said flues being connected thereto; and regenerators located alongside said equalizer certain of said regenerators being provided with means for connecting the same to a supply of gas which requires preheating; substantially as specified.

16. In a coking retort oven, or the like, in combination: heat treating chambers; heating walls contiguous thereto provided with sets of inflow and outflow combustion flues; each inflow set being communicably connected by duct means with an outflow set; regenerators separated from each other by division walls; equalizing channels connected to said flues; and substantially vertical ducts passing through said division walls and connecting with said equalizing channels; substantially as specified.

In testimony whereof, I have hereunto set my hand.

JOSEPH BECKER.